(12) United States Patent
Lee

(10) Patent No.: US 12,304,362 B2
(45) Date of Patent: May 20, 2025

(54) INSTALLATION STRUCTURE FOR TRACK LEVER OF SEAT RAIL

(71) Applicant: DAS CO., LTD, Gyeongsangbuk-do (KR)

(72) Inventor: Jun Hak Lee, Gyeonggi-do (KR)

(73) Assignee: DAS CO., LTD (KR)

( * ) Notice: Subject to any disclaimer, the term of this patent is extended or adjusted under 35 U.S.C. 154(b) by 0 days.

(21) Appl. No.: 18/393,270

(22) Filed: Dec. 21, 2023

(65) Prior Publication Data

US 2024/0383378 A1    Nov. 21, 2024

(30) Foreign Application Priority Data

May 19, 2023    (KR) .................. 10-2023-0064836

(51) Int. Cl.
*B60N 2/08* (2006.01)

(52) U.S. Cl.
CPC ................. *B60N 2/0818* (2013.01)

(58) Field of Classification Search
CPC .. B60N 2/0818; B60N 2/0705; B60N 2/0875; B60N 2/0881; B60N 2/0727; B60Y 2304/03; B60Y 2304/07
USPC ........................................................ 248/429
See application file for complete search history.

(56) References Cited

U.S. PATENT DOCUMENTS

| | | | | |
|---|---|---|---|---|
| 7,722,006 | B2 * | 5/2010 | Beneker | B60N 2/0893 248/424 |
| 9,855,868 | B2 * | 1/2018 | Harvey | B60N 2/085 |
| 10,486,557 | B2 * | 11/2019 | Sportelli | B60N 2/0818 |
| 2004/0131291 | A1 * | 7/2004 | Niimi | B60N 2/0843 384/47 |
| 2010/0327139 | A1 * | 12/2010 | Wojatzki | B60N 2/0715 248/429 |
| 2011/0012004 | A1 * | 1/2011 | Wieclawski | B60N 2/0705 248/429 |
| 2012/0132777 | A1 * | 5/2012 | Nakamura | B60N 2/0818 248/429 |
| 2012/0294674 | A1 * | 11/2012 | Lee | B60N 2/0818 403/322.4 |
| 2013/0214112 | A1 * | 8/2013 | Kawamura | B60N 2/42709 248/429 |

(Continued)

FOREIGN PATENT DOCUMENTS

| | | |
|---|---|---|
| JP | 2013018400 A | 1/2013 |
| KR | 20200015562 A | 2/2020 |
| KR | 102402987 B1 | 5/2022 |

OTHER PUBLICATIONS

Office Action in corresponding Korean Application No. 10-2023-0064836 mailed Dec. 10, 2024, 5 pages.

*Primary Examiner* — Muhammad Ijaz

(57) ABSTRACT

The present disclosure relates to a track lever assembly structure of a seat, which is capable of preventing in advance a lock release phenomenon due to a problem that a rear seat passenger's foot is caught by causing an assembly position between a track lever and a locking assembly to be set within the seat rail, and of changing an assembly structure for interlocking operation between the track lever and the locking assembly into a fastening structure having an interlocking operation method using a holder hinge-coupled to the inside of a moving rail, thereby minimizing the number and weight of related parts and simplifying an assembly process.

6 Claims, 7 Drawing Sheets

(56) References Cited

U.S. PATENT DOCUMENTS

2023/0256872 A1\* 8/2023 Kuroda ................ B60N 2/0705
248/429

\* cited by examiner

INSTALLATION STRUCTURE FOR TRACK LEVER OF SEAT RAIL

CROSS-REFERENCE TO RELATED APPLICATIONS

The present application claims priority to Korean Patent Application No. 10-2023-0064836, filed May 19, 2023, the entire contents of which is incorporated herein for all purposes by this reference.

FIELD

The present disclosure relates to a track lever assembly structure of a seat rail and more particularly to a track lever assembly structure of a seat rail, which is capable of solving a problem that a rear seat passenger's foot is caught by causing an assembly position between a track lever and a locking assembly to be set within the seat rail, and of changing an assembly structure for interlocking operation between the track lever and the locking assembly into a fastening structure having an interlocking operation method using a holder hinge-coupled to the inside of a moving rail, thereby minimizing the number and weight of related parts and simplifying an assembly process.

BACKGROUND

In general, a seat of a vehicle is configured to move a certain section along a seat rail installed in the interior of the vehicle in the forward and backward direction of the vehicle body. For this purpose, the seat rail includes a fixed rail installed in the interior of the vehicle, a moving rail movably installed along the fixed rail, and a locking assembly that locks or releases the movement of the moving rail with respect to the fixed rail if necessary.

In this case, the operation control of the locking assembly is carried out by the operation of a track lever by a user. To this end, the track lever is installed to be interlockable with the locking assembly through the medium of a connecting structure.

Conventionally, the connecting structure between the track lever and the locking assembly is, as disclosed in Korean Patent No. 10-2402987, installed in such a way as to be directly exposed to the outside from the top of the moving rail. Accordingly, in the past, there was a risk that the locking assembly is released due to the problem that a rear seat passenger's foot is caught. Therefore, in order to prevent this, it is necessary to install a separate foot catch prevention structure.

Also, the conventional locking assembly including the track lever is not only directly exposed to the outside of the seat rail, but also requires a plurality of parts for the interlocking operation of the locking assembly by the track lever.

That is, conventionally, as the plurality of parts for the interlocking operation between the track lever and the locking assembly are directly exposed to the outside of the seat rail, a separate prevention structure must be installed in order to solve the problem that a rear seat passenger's foot is caught. As a result, not only does the cost increase, but also a large number of parts are required for interlocking operation between the track lever and the locking assembly. Accordingly, there is a great need to improve due to the increase in the number and weight of related parts.

Also, since the locking assembly of the conventional seat rail is structured to be interlocked with the operation of a walk-in device, the track lever operates together when the walk-in device operates, and thus, for the purpose of preventing this, it is necessary to install additional structural parts. Accordingly, there is a requirement for the improvement of this in the locking assembly of the conventional seat rail.

SUMMARY

The purpose of the present disclosure is to provide a track lever assembly structure of a seat, which is capable of preventing in advance a lock release phenomenon due to a problem that a rear seat passenger's foot is caught by causing an assembly position between a track lever and a locking assembly to be set within the seat rail, and of changing an assembly structure for interlocking operation between the track lever and the locking assembly into a fastening structure having an interlocking operation method using a holder hinge-coupled to the inside of a moving rail, thereby minimizing the number and weight of related parts and simplifying an assembly process.

One embodiment is a track lever assembly structure of a seat rail, which includes: a fixed rail configured to be installed in an interior of a vehicle; a moving rail configured to be installed movably with respect to the fixed rail; a holder configured to be hinge-coupled to an inside of the moving rail; a locking assembly configured to be installed within the moving rail and to perform a fastening operation or a release operation in conjunction with a movement displacement of the holder; and a track lever configured to be assembled to the holder and to control the movement displacement of the holder.

The holder includes: a hinge portion for hinge coupling to the moving rail; a receiving space portion into which one end of the track lever is inserted; and a pressing end portion for controlling a movement displacement of the locking assembly.

The moving rail includes a hinge hole for hinge coupling to the hinge portion.

The holder further includes: a main body portion configured to have the receiving space portion in a longitudinal direction thereof; a first split body portion configured to extend from the main body portion and to be arranged to face each other; and a second split body portion configured to extend from the main body portion and to be arranged to face each other. The hinge portion is formed to protrude outward from the first split body portion, and the locking assembly is assembled to be received between the second split body portions.

The pressing end portion is formed to protrude from the second split body portion of the holder toward a contact portion with the locking assembly.

The holder further includes a damper structure which protrudes toward a contact portion with the locking assembly and mitigates an impact generated when returning itself from an unlock section to a lock section.

An outermost end of the damper structure protrudes further outward than an outermost end of the pressing end portion.

The holder further includes a hook portion which is for preventing the track lever from being separated away, and wherein the track lever comprises a catching recess for coupling to the hook portion.

The track lever assembly structure of a seat rail further includes a return spring which provides a restoring force to the holder, wherein the return spring is installed on a spring holder provided in the holder.

According to the track lever assembly structure of a seat rail according to the embodiment of the present disclosure, the connecting structure for interlocking operation between the track lever and the locking assembly is changed into the structure having an interlocking operation method using the holder that is hinge-coupled to the inside of the moving rail and is installed to perform a turning motion. As a result, the track lever and the locking assembly can be prevented from being exposed to the outside with respect to the moving rail, and through this, not only can the problem that a rear seat passenger's foot is caught be fundamentally solved, but also the lock release phenomenon in the seat rail which is caused by the problem that a rear seat passenger's foot is caught can be prevented in advance.

Also, according to the track lever assembly structure of a seat rail according to the embodiment of the present disclosure, the components of the connecting structure for interlocking operation between the track lever and the locking assembly is simplified to the holder hinge-coupled to the inside of the moving rail and the track lever coupled to the holder by an insertion-type assembly structure in an interlocking operation structure. As a result, it is possible to minimize the number and weight of related parts required for installing the track lever and the locking assembly in the seat rail and to significantly reduce the manufacturing cost through the consequent simplification of an assembly process.

Also, the track lever assembly structure of a seat rail according to the embodiment of the present disclosure has an independent structure in which the track lever does not operate together when the walk-in device operates. Therefore, there is no need to install separate structure parts that prevent unnecessary contact with surrounding items including passengers.

DETAILED DESCRIPTION

Figure 1:
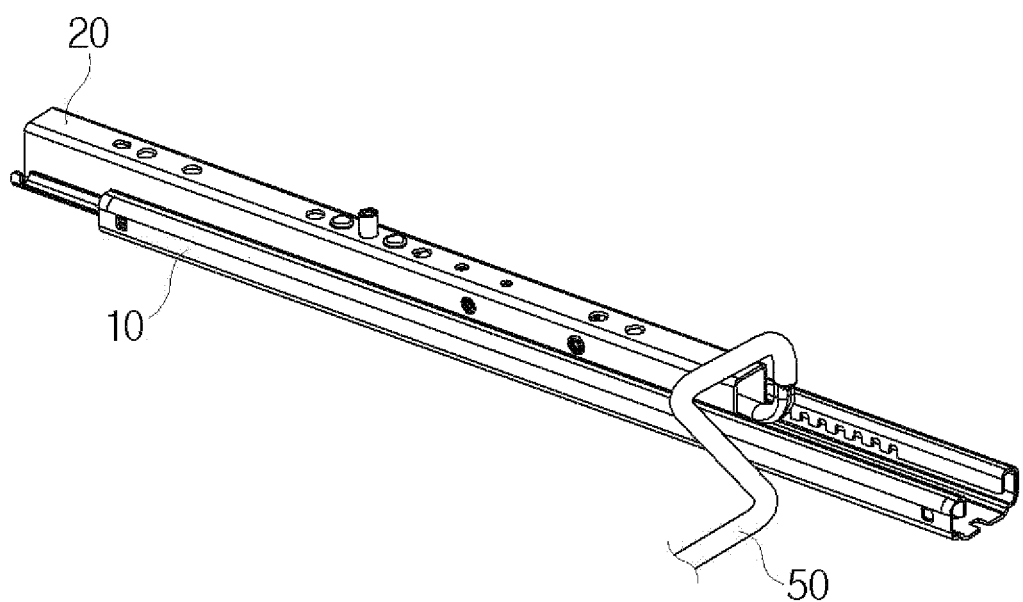
FIG. 1 is a perspective view showing only one side portion of a seat rail to which a track lever assembly structure according to an embodiment of the present disclosure is applied.
Figure 2:
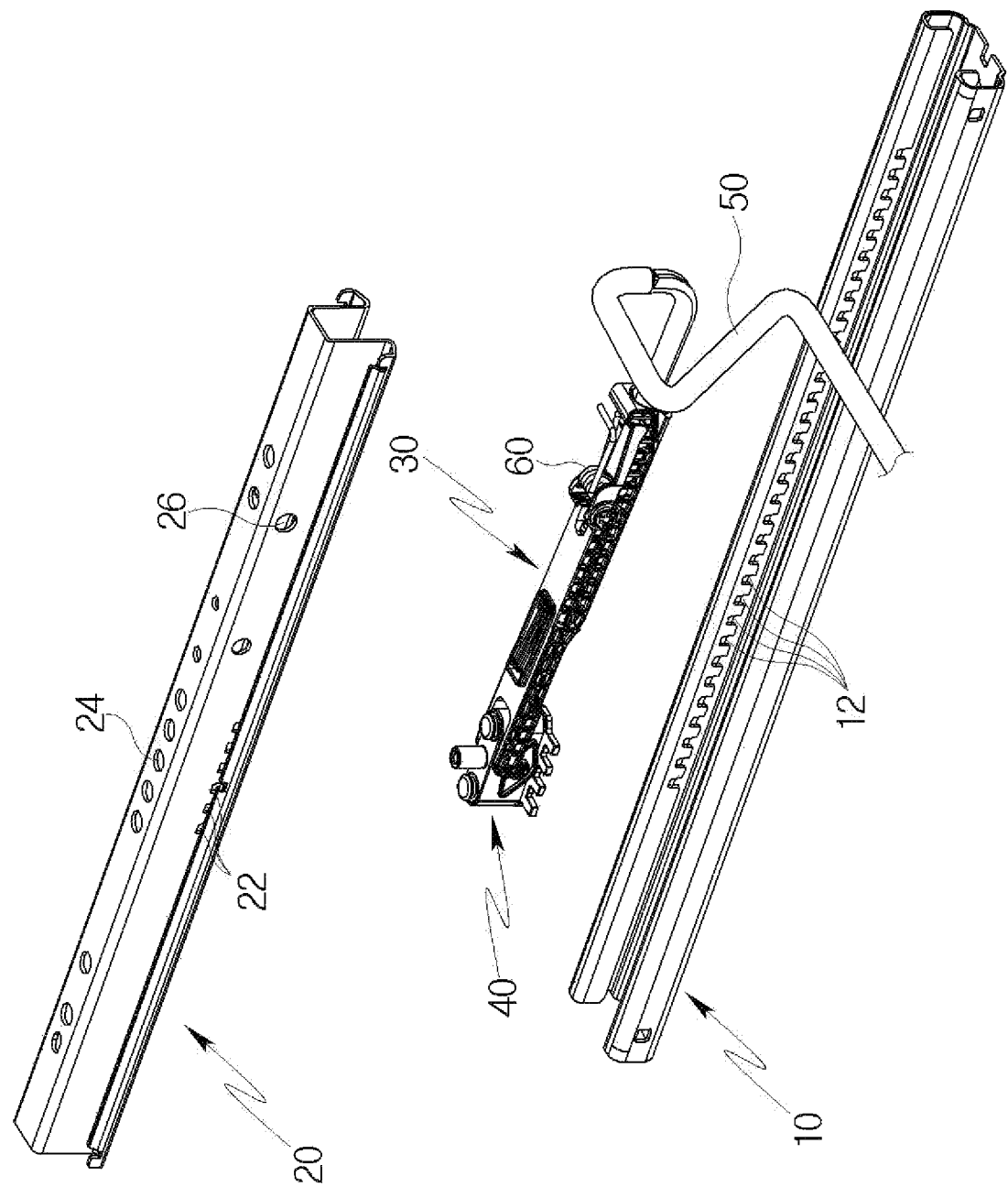
FIG. 2 is an exploded perspective view showing an assembly portion of a holder and the track lever in the seat rail shown in FIG. 1.
Figure 3:
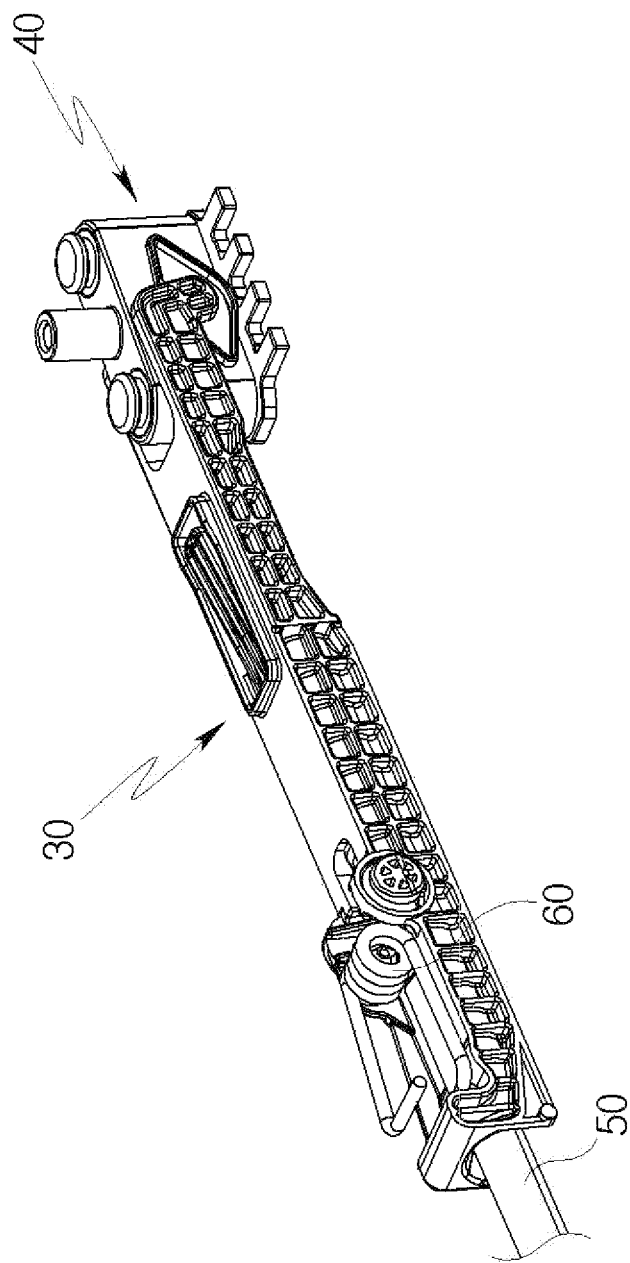
FIG. 3 is an enlarged perspective view showing that only the assembly portion of the holder and the track lever shown in FIG. 2 has been separated.
Figure 4:
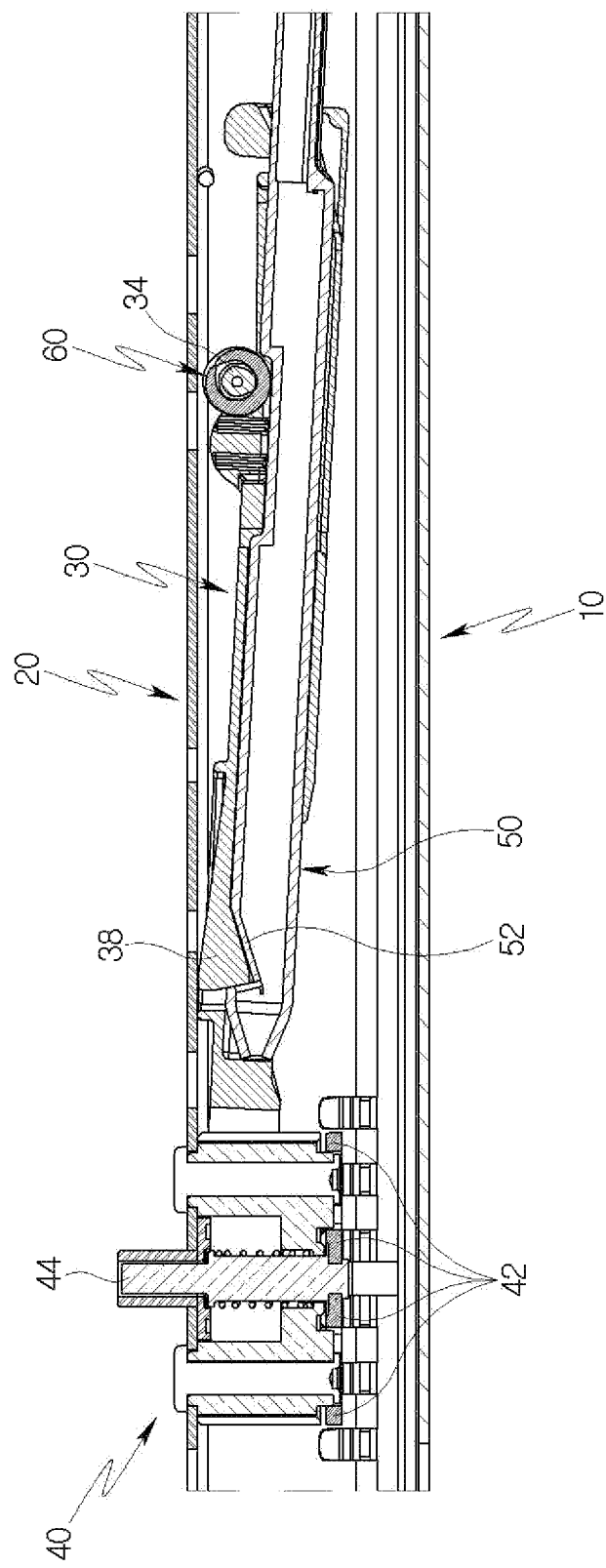
FIG. 4 is a cross-sectional view showing a cross sectional structure of the assembly portion between the holder and the track lever shown in FIG. 3.
Figure 5:
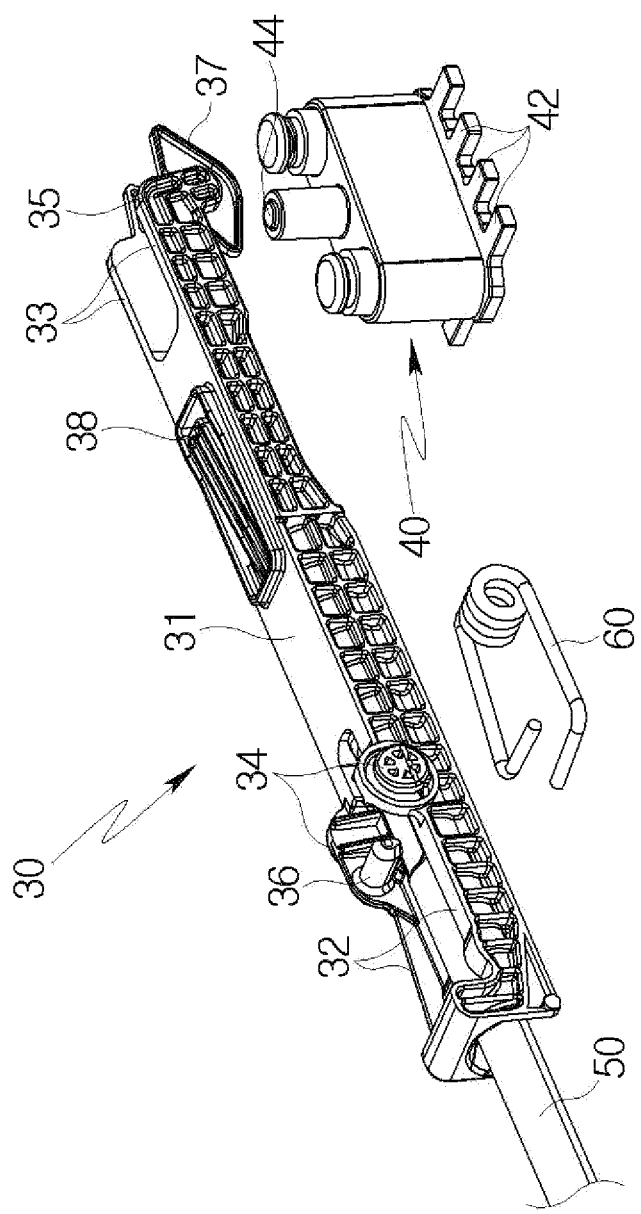
FIG. 5 is an exploded perspective view showing a locking assembly and a return spring which have been separated from the holder shown in FIG. 3.
Figure 6:
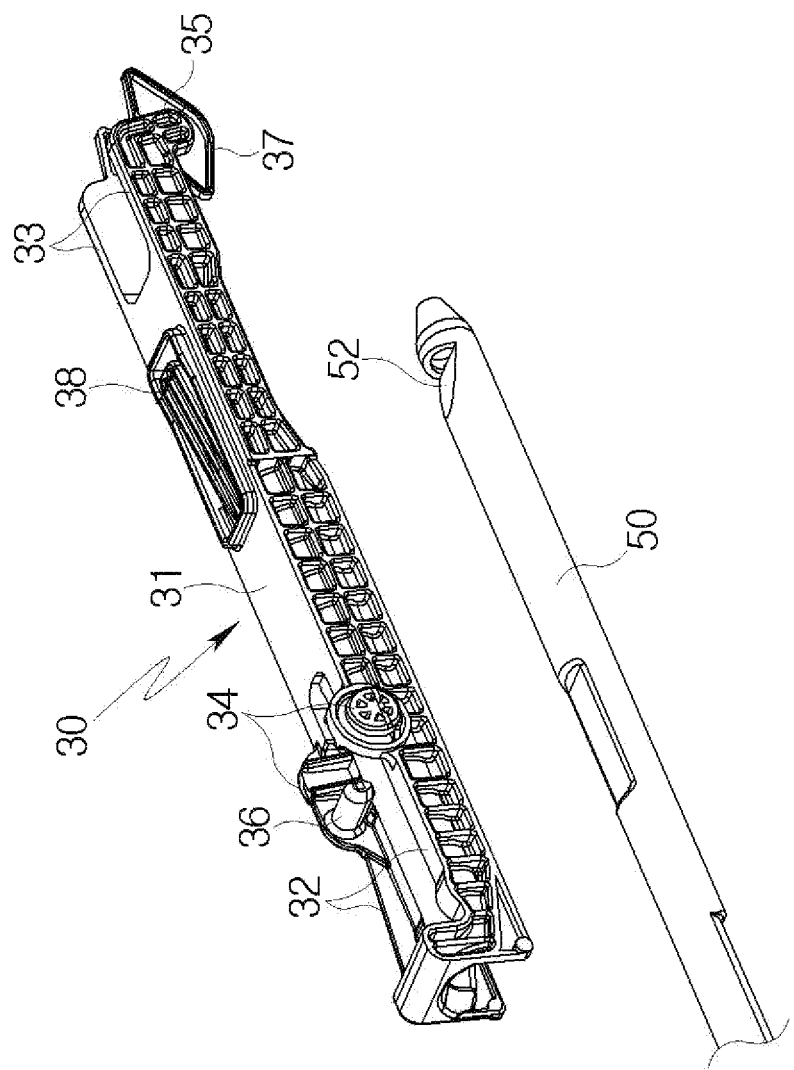
FIG. 6 is an exploded perspective view showing the track lever which has been separated from the holder shown in FIG. 5.
Figure 7:
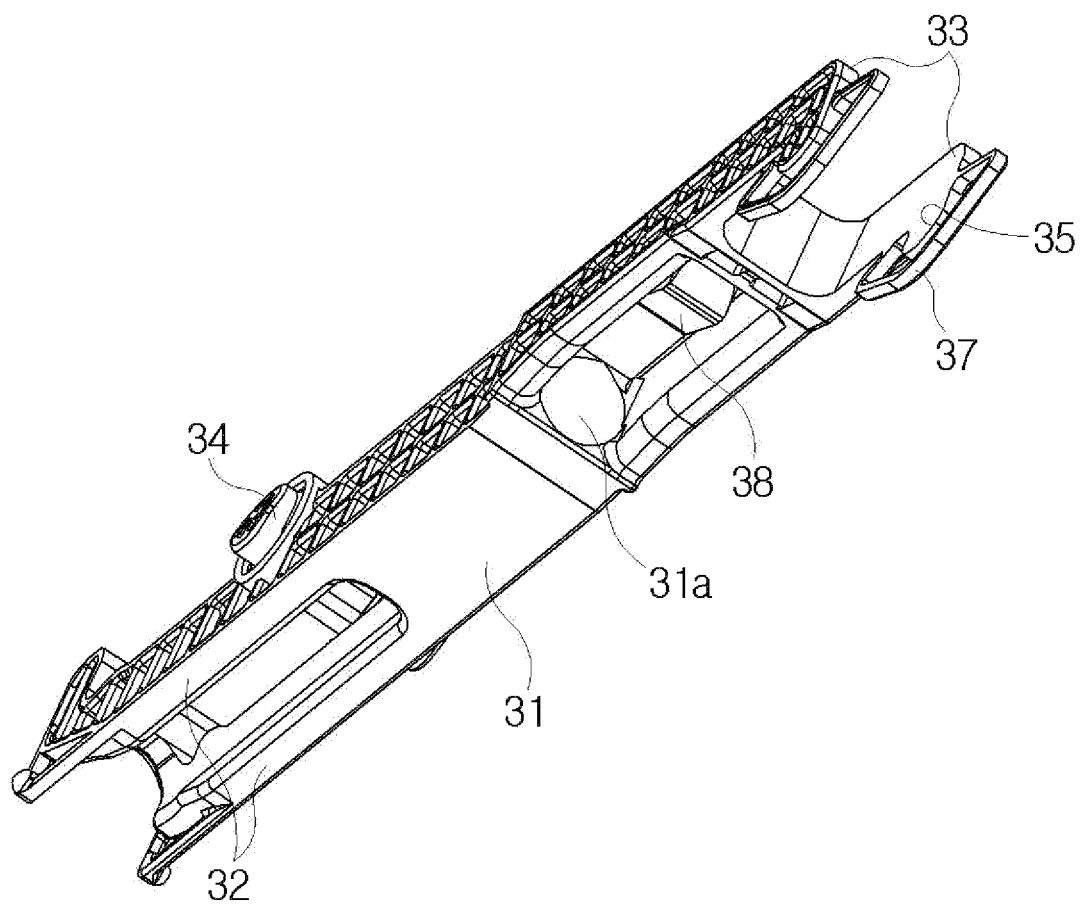
FIG. 7 is a perspective view showing the holder shown in FIG. 6 as viewed from below.

Hereinafter, preferred embodiments of the present disclosure will be described in detail with reference to the accompanying drawings.

Referring to the drawings, a seat rail to which an embodiment of the present disclosure is applied includes a steel-made fixed rail 10 that is installed in the interior of a vehicle, and a steel-made moving rail 20 that is assembled to be movably installed with respect to the fixed rail 10 and supports a seat mounted thereon. Such a seat rail is installed to have an arrangement structure of a pair of left and right seat rails. In the embodiment of the present disclosure, for convenience of description, only the configuration of one seat rail will be limitedly described and shown.

The embodiment of the present disclosure includes a holder 30, a locking assembly 40, and a track lever 50, which are for variably adjusting the position of the moving rail 20 with respect to the fixed rail 10.

In this case, the holder 30 has a structure for assembling by interlockably connecting the locking assembly 40 and the track lever 50. Also, the fixed rail 10 and the moving rail 20 are provided respectively with a plurality of fastening portions 12 and 22 formed in the form of a downward opening at an appropriate distance in the longitudinal directions of the rails.

Here, the locking assembly 40 includes a locking fork 42 that is inserted into the fastening portion 12 of the fixed rail 10 and the fastening portion 22 of the moving rail 20 and then can fix the position of the seat rail. In particular, when the track lever 50 is not operated, the locking fork 42 is inserted between the fastening portion 12 of the fixed rail 10 and the fastening portion 22 of the moving rail 20 through the medium of a spring provided within the locking fork 42, and fixes the position of the moving rail 20 with respect to the fixed rail 10 at a certain position.

That is, the locking fork 42 has a structure that can be interlocked according to the operation of the holder 30 when a user operates the track lever 50. Meanwhile, the locking fork 42 is configured to operate independently of the operation of the holder 30 according to the operation of the track lever 50 when a walk-in device is operated.

The holder 30 is inserted into and hinge-coupled to the moving rail 20, and thus, the movement displacement (turning motion) can be controlled dependently according to the operation of the track lever 50. In this case, the holder 30 may be made of a flexible material such as plastic.

That is, the holder 30 induces a release operation according to a downward displacement of the locking fork 42 in accordance with the operation of the track lever 50, thereby temporarily limiting a fastening function of the locking assembly 40. As a result, the holder 30 serves to allow freely the forward and backward displacement of the movable rail 20 with respect to the fixed rail 10.

The locking assembly 40 is installed within the moving rail 20 and selectively perform a fastening operation or a release operation on the seat rail in conjunction with the movement displacement of the holder 30. To this end, in the locking assembly 40, the locking fork 42 performs the fastening operation or the release operation on the seat rail in conjunction with the movement displacement of the holder 30.

Also, apart from the movement displacement of the holder 30, the locking assembly 40 can selectively perform the fastening operation or the release operation on the seat rail by an operating force provided from the walk-in device (not shown). To this end, the locking assembly 40 includes a locking pole 44. The locking pole 44 is elastically pressed by the operating force provided from the walk-in device (not shown), thereby independently controlling the movement displacement relative to the locking fork 42. That is, the locking pole 44 is configured to transmit the operating force to the locking fork 42 independently of the displacement of the holder 30. Also, the moving rail 20 is provided with a through hole 24 that exposes the locking pole 44 to the outside and then allows the locking pole 44 to receive the operating force from the walk-in device.

The track lever 50 is assembled in such a way that bent portions positioned on both ends are inserted into the holder 30, and controls the movement displacement of the holder 30, thereby causing the fastening operation or the release operation by the locking assembly 40 to be accompanied. That is, one end of the track lever 50 is assembled to the holder 30, so that, when an upward displacement occurs according to user's operation, the operating force for the release operation of the locking assembly 40 is directly provided to the holder 30.

Detailed configuration of the embodiment of the present disclosure will be described as follows.

The holder 30 includes a main body portion 31, a first split body portion 32, and a second split body portion 33. The main body portion 31 includes a receiving space portion 31a where one end of the track lever 50 is inserted and received. The first split body portions 32 integrally extend from the main body portion 31 and are arranged to face each other. The second split body portions 33 integrally extend from the main body portion 31 and are arranged to face each other.

In this case, it is preferable that the receiving space portion 31a should be formed in a long shape that passes through the member constituting the main body portion 31 in the longitudinal direction. Also, the first split body portion 32 extends from the main body portion 31 in one direction and is composed of a pair of members arranged to face each other at an appropriate interval. Also, the second split body portion 33 extends from the main body portion 31 in the other direction and is composed of a pair of members arranged to face each other at an appropriate interval. Here, the locking assembly 40 may be assembled in a shape that is received in a space formed between the second split body portions 33.

Also, the holder 30 further includes a hinge portion 34 and a pressing end portion 35. The hinge portion 34 enables free movement displacement through hinge coupling to the moving rail 20. The pressing end portion 35 transmits the direct operating force to the locking fork 42 in order to control the movement displacement of the locking assembly 40.

In this case, the hinge portion 34 is provided on a portion of the main body portion 31 where the first split body portion 32 is formed and serves to enable the movement displacement (turning motion) of the holder 30 to be implemented within the moving rail 20. Here, the hinge portion 34 may be formed to protrude outward from the first split body portion 32. Also, the moving rail 20 may include a hinge hole 26 formed therein for hinge-coupling to the hinge portion 34. Also, the assembly of the hinge portion 34 of the holder 30 to the hinge hole 26 of the moving rail 20 can be performed more easily by using the elasticity owned by the first split body portion 32 itself.

Also, the pressing end portion 35 is provided on a portion of the main body portion 31 where the second split body portion 33 is formed and serves to enable the downward displacement of the locking fork 42 according to the movement displacement of the holder 30 to be implemented. To this end, the pressing end portion 35 may be formed to protrude downward from the second split body portion 33 toward the locking fork 42 which corresponds to a contact portion with the locking assembly 40. Accordingly, the pressing end portion 35 directly receives the operating force resulting from the movement displacement of the holder 30 and pushes the locking fork 42 downward, so that the locking assembly 40 can be switched from the fastened state to the release state.

Meanwhile, the track lever assembly structure of the seat rail according to the embodiment of the present disclosure further includes a return spring 60 that provides a restoring force to the holder 30 and maintains the locking assembly 40 in the fastened state when the track lever 50 is not operated. That is, the return spring 60 provides a downward elastic force to the first split body portion 32 of the holder 30 when the track lever 50 is not operated, and then the second split body portion 33 of the holder 30 can be moved to an upward position, thereby serving to prevent the pressing force from being transmitted from the pressing end portion 35 to the locking fork 42.

Also, the holder 30 further includes a spring holder 36 that protrudes outward to allow the return spring 60 to be mounted. Here, the spring holder 36 may be formed on the first split body portion 32 of the holder 30.

Also, the holder 30 includes a damper structure 37. The damper structure 37 protrudes downward toward the locking fork 42 corresponding to a contact portion with the locking assembly 40, and mitigates and absorbs the impact generated from abnormal contact due to positional mismatch that occurs between the fastening portion 12 of the fixed rail 10 and the locking fork 42 and the fastening portion 22 of the moving rail 20 and the locking fork 42 when returning itself from an unlock section to a lock section. Here, the damper structure 37 may be formed in the form of an elastic structure capable of exerting its own elastic force according to a shape characteristic that the damper structure 37 is bent at the second split body portion 33 of the holder 30 in a closed cross section structure. In particular, it is more desirable that an outermost end of the damper structure 37 should protrude further outward than an outermost end of the pressing end portion 35 in the second split body portion 33.

Also, the holder 30 includes a hook portion 38 which is for preventing the track lever 50 from being separated away to the outside by an external force or the like while the holder 30 is assembled with the track lever 50. Here, the track lever 50 is provided with a catching recess 52 for establishing a structure for catching the hook portion 38. That is, the hook portion 38 is coupled to the catching recess 52, and thus, serves to suppress the track lever 50 from being separated from the holder 30.

Therefore, according to the embodiment of the present disclosure configured as described above, the conventional connecting structure that is installed in such a way as to be directly exposed to the outside from the top of the moving rail for interlocking operation between the track lever 50 and the locking assembly 40 is changed into the structure having an interlocking operation method using the holder that is hinge-coupled to the inside of the moving rail 20 and is installed to perform a turning motion. As a result, the track lever 50 and the locking assembly 40 can be prevented from being exposed to the outside with respect to the moving rail 20, and through this, not only can the problem that a rear seat passenger's foot is caught be fundamentally solved, but also the lock release phenomenon in the seat rail which is caused by the problem that a rear seat passenger's foot is caught can be prevented in advance.

Also, in the embodiment of the present disclosure, the components of the connecting structure for interlocking operation between the track lever 50 and the locking assembly 40 is simplified to the holder 30 hinge-coupled to the inside of the moving rail 20 and the track lever 50 coupled to the holder 30 by an insertion-type assembly structure in an interlocking operation structure. As a result, it is possible to minimize the number and weight of related parts required

| REFERENCE NUMERALS | |
|---|---|
| 10: Fixed Rail | 12: Fastening Portion |
| 20: Moving Rail | 22: Fastening Portion |
| 24: Through Hole | 26: Hinge Hole |
| 30: Holder | 31: Main Body Portion |
| 32: First Split Body Portion | 33: Second Split Body Portion |
| 34: Hinge Portion | 35: Pressing End Portion |
| 36: Spring Holder | 37: Damper Structure |
| 38: Hook Portion | 42: Locking Fork |
| 40: Locking Assembly | 52: Catching Recess |
| 44: Locking Pole | |
| 50: Track Lever | |
| 60: Return Spring | |

What is claimed is:

1. A track lever assembly structure of a seat rail, the track lever assembly structure comprising:
    a fixed rail configured to be installed in an interior of a vehicle;
    a moving rail configured to be installed movably with respect to the fixed rail;
    a holder configured to be hinge-coupled to an inside of the moving rail;
    a locking assembly configured to be installed within the moving rail and to perform a fastening operation or a release operation in conjunction with a movement displacement of the holder; and
    a track lever configured to be assembled to the holder and to control the movement displacement of the holder
    wherein the holder comprises:
    a hinge portion for hinge coupling to the moving rail;
    a receiving space portion into which one end of the track lever is inserted;
    a pressing end portion for controlling a movement displacement of the locking assembly; and
    a damper structure which protrudes toward a contact portion with the locking assembly and mitigates an impact generated when returning itself from an unlock section to a lock section,
    wherein an outermost end of the damper structure protrudes further outward than an outermost end of the pressing end portion.

2. The track lever assembly structure of a seat rail of claim 1, wherein the moving rail comprises a hinge hole for hinge coupling to the hinge portion.

3. The track lever assembly structure of a seat rail of claim 1, wherein the holder further comprises:
    a main body portion configured to have the receiving space portion in a longitudinal direction thereof;
    a first split body portion configured to extend from the main body portion and to be arranged to face each other; and
    a second split body portion configured to extend from the main body portion and to be arranged to face each other,
    wherein the hinge portion is formed to protrude outward from the first split body portion, and the locking assembly is assembled to be received between the second split body portions.

4. The track lever assembly structure of a seat rail of claim 3, wherein the pressing end portion is formed to protrude from the second split body portion of the holder toward a contact portion with the locking assembly.

5. The track lever assembly structure of a seat rail of claim 1, wherein the holder further comprises a hook portion which is for preventing the track lever from being separated away, and wherein the track lever comprises a catching recess for coupling to the hook portion.

6. The track lever assembly structure of a seat rail of claim 5, further comprising a return spring which provides a restoring force to the holder, wherein the return spring is installed on a spring holder provided in the holder.

* * * * *